United States Patent [19]

Twerdochlib

[11] Patent Number: 4,833,916
[45] Date of Patent: May 30, 1989

[54] MONITOR FOR TESTING THE OPERATING CONDITION OF A NONRETURN VALVE

[75] Inventor: Michael Twerdochlib, Oviedo, Fla.

[73] Assignee: Westinghouse Electric Corp., Pittsburgh, Pa.

[21] Appl. No.: 114,477

[22] Filed: Oct. 30, 1987

[51] Int. Cl.$^4$ ............................................. G01M 19/00
[52] U.S. Cl. ..................... 73/168; 137/554; 251/129.11; 251/129.12
[58] Field of Search ............ 251/129.01, 129.02, 251/129.03, 129.04, 129.05, 129.06, 129.07, 129.08, 129.09, 129.1, 129.11, 129.12, 129.13, 129.14, 129.15, 129.16, 129.17, 129.18, 129.19, 129.2, 129.21, 129.22; 137/551, 552, 553, 554, 557; 73/168

[56] References Cited

U.S. PATENT DOCUMENTS

| | | | |
|---|---|---|---|
| 3,098,382 | 7/1963 | Hoffman et al. | 73/168 |
| 4,029,122 | 6/1977 | Jaegtnes | 73/168 |
| 4,274,438 | 6/1981 | La Coste | 137/551 |
| 4,425,789 | 1/1984 | Andreev et al. | 73/168 |
| 4,542,649 | 9/1985 | Charbonneav et al. | 73/168 |
| 4,545,406 | 10/1985 | King | 137/553 |
| 4,570,903 | 2/1986 | Crass | 251/129.12 |
| 4,694,390 | 9/1987 | Lee | 137/554 |

Primary Examiner—William M. Shoop, Jr.
Assistant Examiner—Brian Young

[57] ABSTRACT

Apparatus for monitoring displacement of a translational member in a pressurized vessel. In one form, the apparatus comprises first and second fluid containing compressible bellows each coupled to a differential pressure gauge in order to measure pressure fluctuations between the bellows. An end portion of the first bellows is coupled to the translational member in order to receive a variable compressive force as the member is displaced. The displacement of the translational member is determined as a function of the pressure variation between the first and second bellows.

11 Claims, 6 Drawing Sheets

MONITOR FOR TESTING THE OPERATING CONDITION OF A NONRETURN VALVE

FIELD OF THE INVENTION

This invention relates to steam systems and, more particularly, to a monitor for evaluating the condition of a nonreturn valve in a steam turbine system.

BACKGROUND OF THE INVENTION

Steam turbine systems such as the type used in commercial electric power plants contain many critical valves having stationary and non-stationary components which degrade in service. Consequently, these components must be periodically examined in order to assess their condition. However, because many of the necessary inspections can only be made when the turbine system is off line, limited on-line tests are normally performed to assess the operating condition of many critical valves. In the past, this limited on-line testing has been a time consuming, labor intensive process requiring concurrent involvement of control room operators to adjust turbine operating parameters, mechanics to perform tests at the valve site and personnel to coordinate test activities between the control room and the valve site. On-line testing procedures have also required that personnel work in close proximity to hot, high energy steam. As a result of these manual procedures which require the participation of numerous power plant personnel at the expense of competing maintenance demands, the testing of critical valves is often postponed and performed less frequently than necessary in order to assure proper valve operation. Consequently, valve failures may not be detected until after they cause significant turbine damage.

An example of a critical valve that may develop defects which are not readily detectable is a nonreturn valve positioned to prevent reverse steam flow in an extraction pipe of a large steam turbine system. As is well known, the steam cycle in a large turbine system involves circulation of feedwater into a boiler, where it is converted to steam. Such water, coming from a condenser plus that condensed from many extractions, is heated in stages before being pumped into the boiler. Extraction pipes are commonly connected to various turbine stages in order to remove a portion of the high energy steam to reheat turbine feed water as it returns to the boiler. The extracted steam is condensed to form superheated water which is then mixed with the relatively cool water flowing from the condenser. This process improves the efficiency of the steam cycle by reducing the temperature differential between water in the boiler and feed water circulated from the condenser to the boiler for reheating.

When a steam turbine electric power plant experiences a drop in electrical load or load rejection, e.g., a major power loss due to a line fault, or even a lesser power loss of the type incurred during an anticipated partial shut down, one or more turbines must be taken off line. When a turbine is taken off-line, superheated water within the heaters or extraction pipes is subject to reduced pressure, resulting in flashing and a reverse flow of wet steam and water through the extraction pipe toward the turbine blading. Because an off-line turbine is not under load this reverse flow can result in an overspeed condition in addition to a harmful infiltration of cold steam and water into the turbine. To prevent this reverse flow, fast acting nonreturn valves are placed in the extraction pipes. These valves degrade in service and must be periodically examined in order to avoid malfunctions during emergency power shutdowns. Defects in a nonreturn valve are difficult to detect without disassembly, and only limited on-line testing can be performed to confirm the integrity of valve components. Necessary testing and inspection to assure proper operation of nonreturn valves is often postponed due to the nature of the manual test procedures and because of competing maintenance demands. It is therefore desirable to provide an alternate nonmanual means for periodically or continuously monitoring the operational capability of a nonreturn valve within a pressurized extraction pipe.

SUMMARY OF THE INVENTION

It is an object of the present invention to provide an improved means for assessing the integrity of critical valves in a pressurized steam system.

It is another object of the present invention to provide a position sensor for directly monitoring the movement of critical valve components through displacement measurements within a high temperature, high pressure vessel.

It is still another object of the invention to provide a means for early detection of concealed valve failures.

It is a further object of the invention to provide a monitoring system for testing the operational status of valve components which are not subject to visual inspection during normal operation.

In one form, the present invention comprises a monitor for testing the operational status of a nonreturn valve in a steam turbine electric power generating system. The monitor determines the relative position of non-stationary valve components and compares actual component positions with expected positions in order to assess valve performance and identify failures in critical valve components.

In a preferred embodiment of the invention, the monitor comprises a first and a second compressible bellows or diaphragm, each filled with relatively incompressible fluid such as hydraulic oil, positioned adjacent one another in the nonreturn valve. A differential presure gauge, positioned outside the valve, is coupled to each of the bellows for monitoring pressure fluctuations between the bellows. An end portion of the first bellows is coupled to a rotatable closure disc of the nonreturn valve in order to receive a variable compressive force as the disc is rotated between valve open and valve closed positions. As the disc rotates and provides an increasing compressive force against the first bellows, the fluid pressure in the first bellows increases. The resulting pressure variation between the first and second bellows, as measured by the differential pressure gauge, is proportional to the displacement of the valve closure disc.

BRIEF DESCRIPTION OF THE DRAWINGS

For a better understanding of the invention, reference may be had to the following detailed description taken in conjunction with the accompanying drawings in which:

FIGS. 6 and 7 illustrate a preferred embodiment of the invention for monitoring the operational status of the nonreturn valve shown in FIGS. 1 and 2.

DETAILED DESCRIPTION OF THE INVENTION

Figure 1:
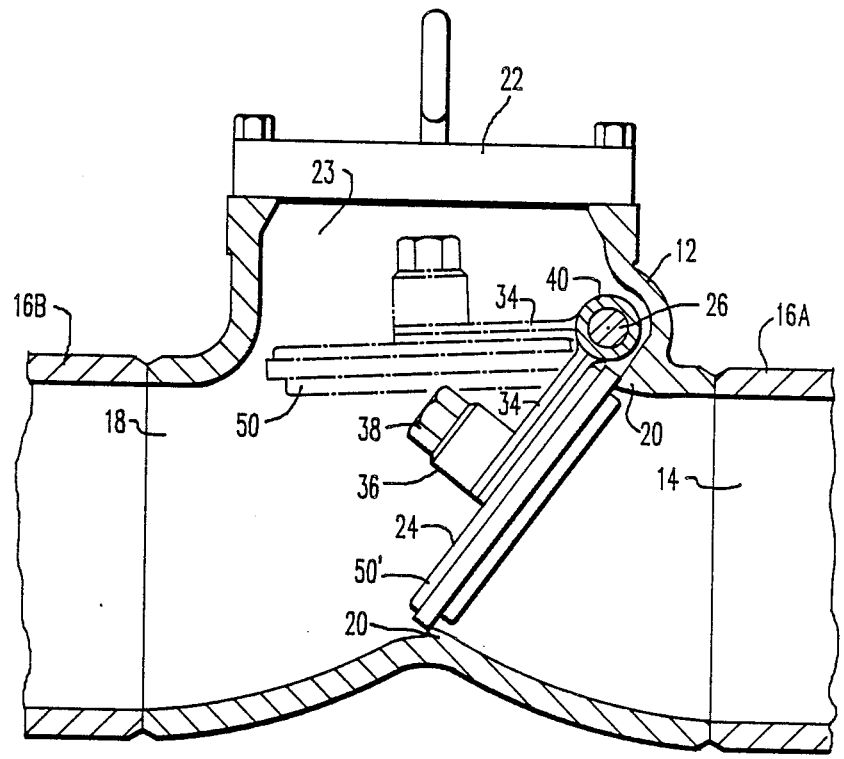
FIG. 1 is a profile view in cross-section of a nonreturn valve.
Figure 2:
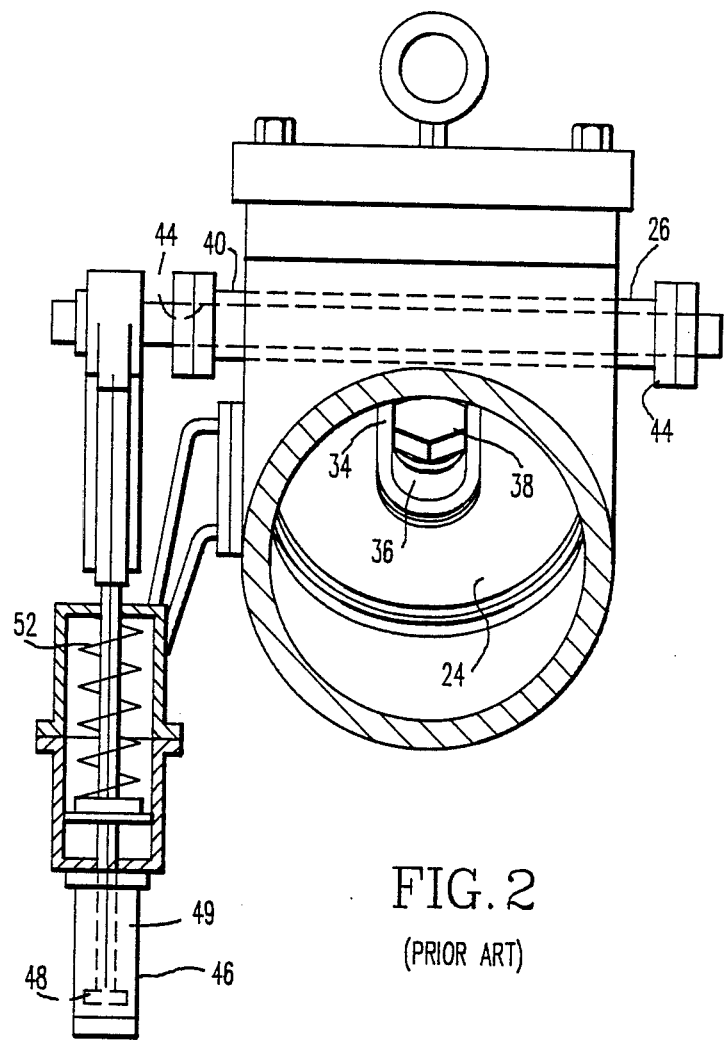
FIG. 2 is a plan view in cross-section of the nonreturn valve shown in FIG. 1.

Although the invention is generally applicable to a variety of check valves and stop valves used in high pressure steam lines, it is described herein with particular application to monitoring the condition of a nonreturn valve in a steam turbine system. With reference to FIGS. 1 and 2 there is illustrated a power assisted nonreturn valve 10 of the type used to control reverse flow in a steam turbine extraction pipe. The valve 10 is comprised of a valve housing 12 which has an inlet 14 for receiving steam from a first segment 16A of extraction pipe and an outlet 18 for transmitting steam through a second segment 16B of extraction pipe. A cover plate 22, removable for valve inspection and repair, is bolted to an upper portion of the valve housing 12 over an access port 23. A valve seat 20 is disposed circumferentially about a portion of the valve housing adjacent the valve inlet 14. A valve disc 24, connected for rotation about a valve shaft 26, is positionable against the valve seat. The valve disc connection is effected by a valve arm 34 secured at a first end 36 to the valve disc 24 with a threaded bolt 38. A second end 40 of the valve arm 34 is rotatably connected about the valve shaft 26 with valve shaft bearings 44 interposed therebetween.

During normal operation, a servo motor 46, as illustrated in FIG. 2, operates under pneumatic or hydraulic fluid pressure forces to maintain an actuator piston 48 and rod 49 in extended positions. The rod 49 is coupled to the valve arm 34 to rotate the disc 24 away from the valve seat 20 to an open position 50 as illustrated by phantom lines in FIG. 1. Upon receiving a trip signal associated with turbine shut down from the turbine control system, fluid pressure in the servo motor 46 is released through a dump valve (not illustrated) and a spring 52 retracts the actuator piston 48, rotating the valve arm 34 so that the valve disc 24 becomes subject to fluid forces associated with reverse steam flow. The reverse flow forces the valve disc 24 into a closed position 50' against the valve seat 20. When normal turbine operation is resumed, the turbine control system again provides hydraulic pressure to the servomotor 46, causing the actuator piston 48 to overcome the closing force of the retractor spring 52, thus rotating the valve disc 24 to an open position 50.

Figure 3:
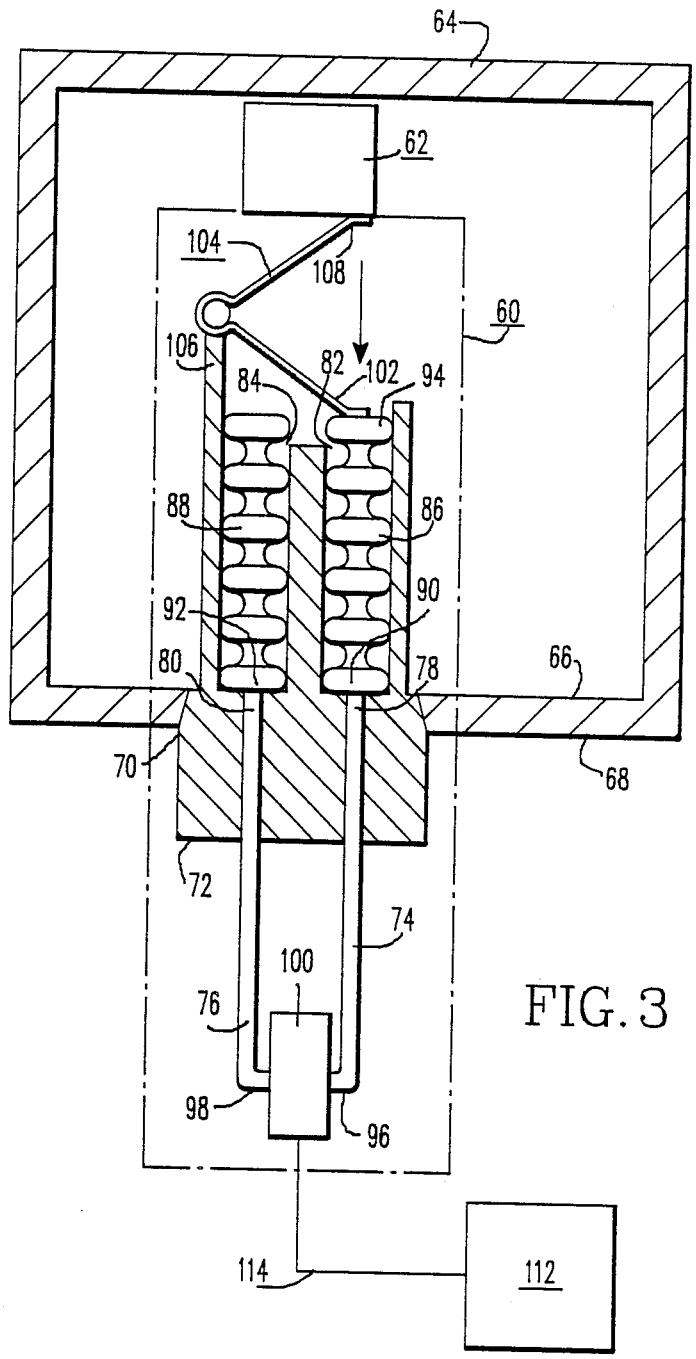
FIG. 3 illustrates in a simplified cross-sectional view a novel apparatus for monitoring the displacement of a translational member in a vessel containing high temperature, high pressure fluid.
Figure 4:
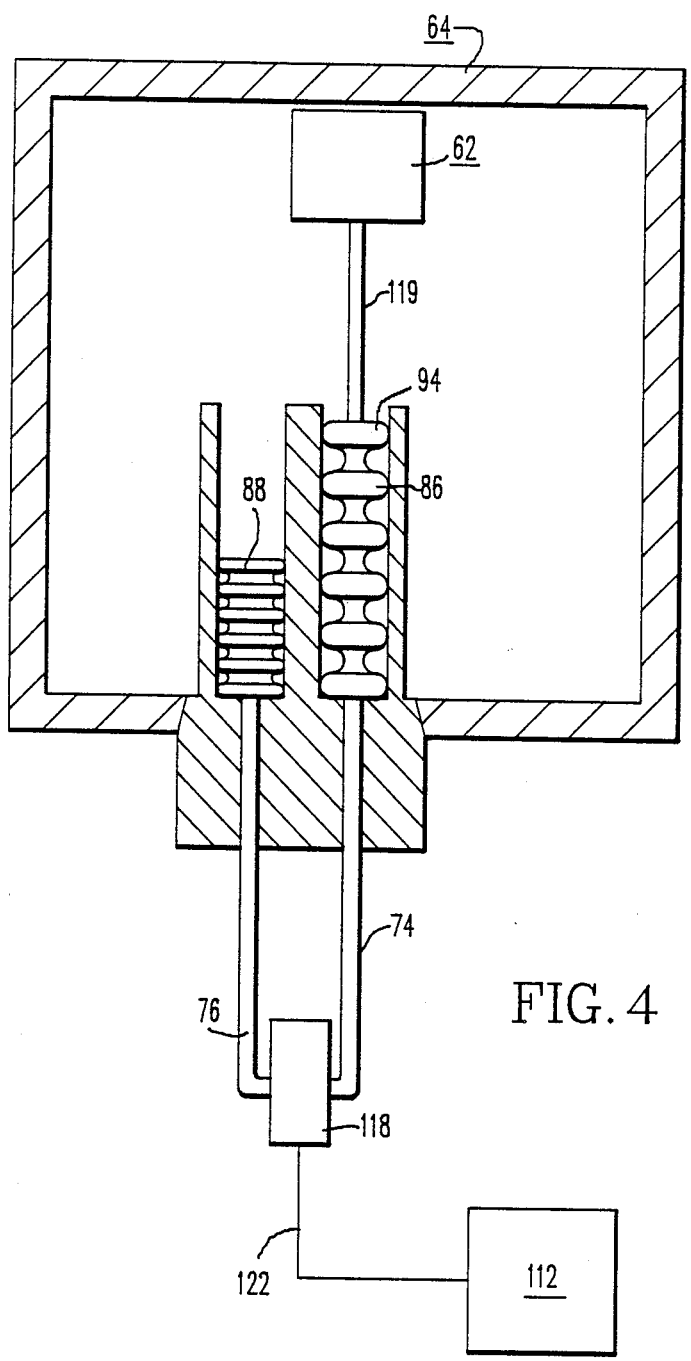
FIGS. 4 and 5 illustrate in cross sectional view an alternate form of the invention for monitoring the displacement of a translational member.

The above described nonreturn valve 10 is subject to several defect modes which may be readily detected by the monitoring apparatus 60 which is illustrated in FIGS. 3 and 4. These defects include: failure of the actuator piston 48 to respond to the trip signal; malfunction of the linkage between the actuator piston 48 and the valve arm 34; corrosion or galling of bearing surfaces which may prevent rotation of the valve arm 34 about the valve shaft 26; and loosening of the bolt 38 which fastens the valve disc 24 to the valve arm 34, thus causing the valve disc 24 to fall out of alignment with the valve seat 20 or to completely disconnect from the valve arm 34.

Referring now to FIG. 3 there is illustrated in simplified form a novel apparatus 60 for externally monitoring the displacement of a translational member 62 in a vessel 64 containing a high temperature, high pressure fluid. The vessel 64 includes a wall 65 having an inner surface 66, an outer surface 68 and a threaded bore 70 positioned to receive a sensor mount 72 through the vessel wall 65. First and second tubes 74 and 76, suitable for holding pressurized fluid, have first ends 78 and 80 extending through the sensor mount 72 and into the vessel 64.

The sensor mount 72 includes first and second slots 82 and 84 for supporting and slightly guiding movement of first and second compressible bellows 86 and 88. The first bellows 86 is connected at a lower end 90 to the first end 78 of the first tube 74. The second bellows 88 is connected at a lower end 92 to the first end 80 of the second tube 76. Each tube 74, 76 is connected at a second end 96, 98 to a differential fluid pressure sensor 100. Connections between the first and second tubes 74 and 76, the first and second bellows 86 and 88 and the sensor 100 are sealed and the tubes and bellows are each filled with a relatively incompressible fluid such as a hydraulic oil.

A first portion 94 of the first bellows 86 is positioned to receive a compressive force from a first end 102 of a pinched leaf spring 104. A second end 108 of the spring 104 is in contact with the translational member 62. The spring 104 is pivotally supported by an arm 106 extending from the sensor mount 72 so that movement of the translational member 62 compresses the spring 104 causing the first end 102 of the spring 104 to exert a force on the first portion 94 of the first bellows 86.

In the preferred form of the invention, the fluid sensor 100 comprises a differential pressure gauge in fluid communication with each tube 74 and 76 which provides a signal responsive to pressure differences between the incompressible fluid contained in each of the two bellows 86 and 88. A microcomputer 112 monitors the differential pressure through a signal line 114.

The apparatus 60 for monitoring displacement of the translational member 62 operates in the following manner. When the translational member 62 is positioned so that no compressive force is exerted by the leaf spring 104 on the first portion 94 of the first bellows 86, the pressure of the incompressible fluid contained in each of the bellows 86 and 88 is substantially in equilibrium with the high temperature, high pressure fluid in the vessel 64. Under this equilibrium condition the differential pressure gauge fluid sensor 100 provides a signal indicating that there is no pressure variation between the first and second bellows 86 and 88. Generally, changes in the pressure or temperature of the vessel fluid will not cause a significant pressure variation between the first and second bellows.

As the translational member 62 moves downward (in the orientation of FIG. 3) the leaf spring 104 becomes compressed, exerting a force against the first portion 94 of the first bellows 86. Under this unbalanced condition the pressure of the incompressible fluid in the first bellows 86 increases and the differential pressure sensor 100 provides a signal proportional to the pressure variation between the two bellows. The signal is also directly proportional to the displacement of the translational member 62.

Figure 5:
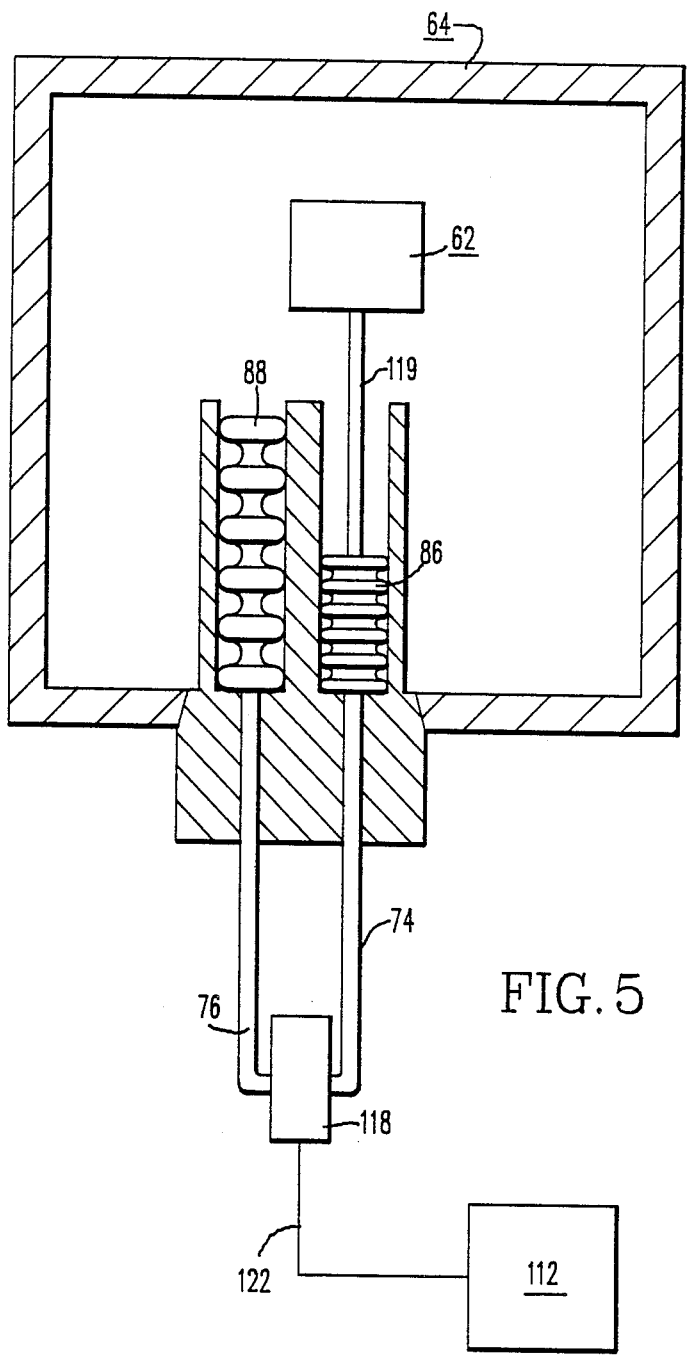

In an alternate form of the invention, as illustrated in FIGS. 4 and 5, the fluid pressure sensor 100 is replaced by a flowmeter 118 and the first portion 94 of the first bellows 86 is rigidly coupled to the translational member 62 with a rod 119. When the translational member 62 is stationary in the nonextended position shown in FIG. 4, the first bellows 86 is in an expanded state, the second bellows 88 is in a compressed state and fluid pressure between the first and second bellows 86 and 88 is equal. As the translational member 62 is displaced downward (in the orientation of FIGS. 4 and 5) toward the extended position illustrated in FIG. 5, fluid pressure in the first bellows 86 exceeds fluid pressure in the second bellows 88, causing the incompressible fluid to pass from the first tube 74 through the flowmeter 118 and into the second tube 76 until fluid pressure between the first and second bellows 86 and 88 again reaches an equilibrium state. In this new equilibrium state, corresponding to downward displacement of the translational member 62, the first bellows 86 is in a compressed state and the second bellows 88 is in an expanded state.

Displacement of the translational member 62 is monitored with the flowmeter 118 based on the volumetric flow of incompressible fluid moving between the first and second tubes 74 and 76. The signal provided by the flowmeter 118 is directly proportional to the speed at which the translational member 62 moves and the net fluid volume displaced through the flowmeter at any given time is a function of the distance which the translational member moves. The microcomputer 112 continuously monitors the flow through a flowmeter signal line 122 and computes the relative displacement of the translational member 62 as a function of fluid displacement.

Figure 6:
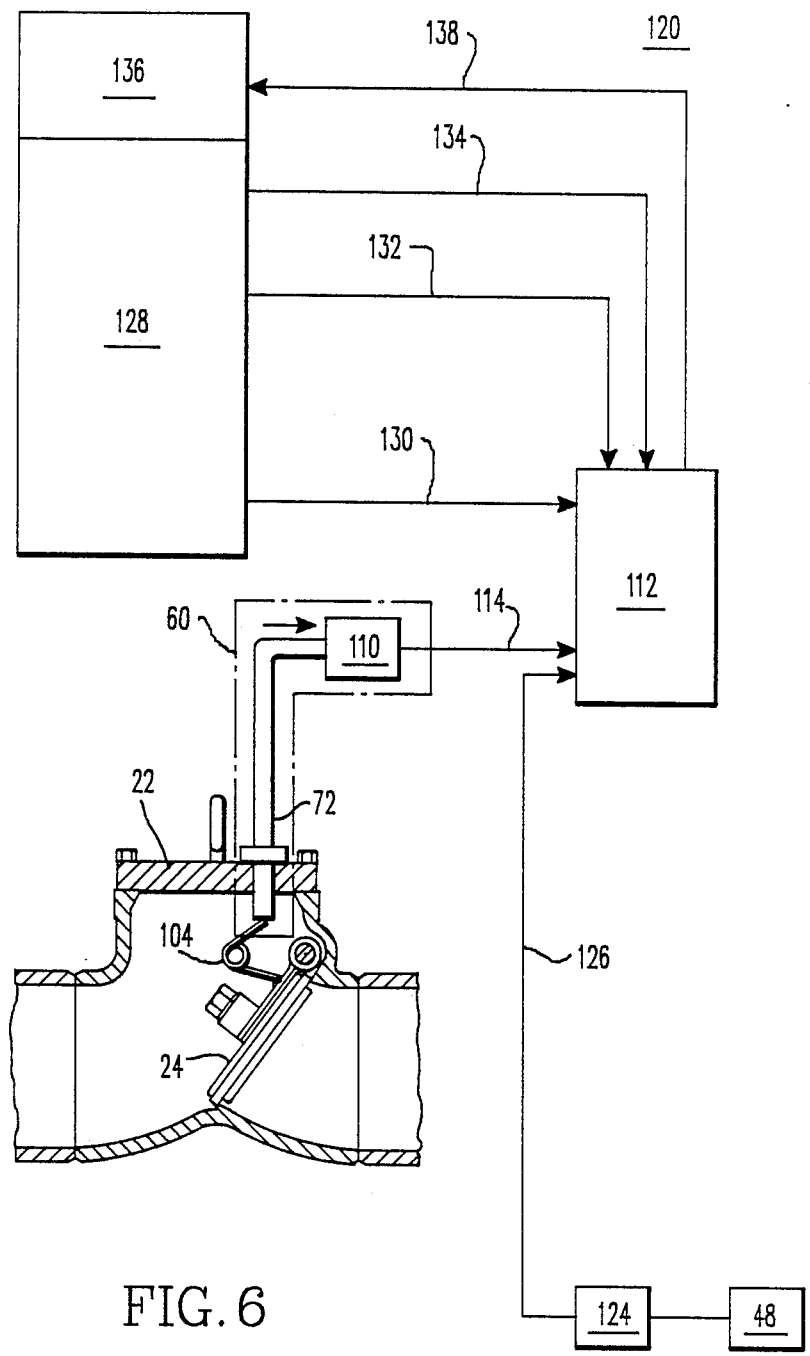

FIGS. 6 and 7 illustrate an application of the apparatus of FIG. 3 to a valve monitor system 120 for determining the operational status of a nonreturn valve disc 24 with a differential pressure sensor 100. Reference numbers in FIGS. 6 and 7 which correspond to reference numbers in FIGS. 1 and 3 refer to similar components described above. The sensor mount 72 passes through the valve cover plate 22 and a leaf spring 104 is positioned between the valve disc 24 and the first bellows 86, in the same manner as has been illustrated generally for a translational member 62 in FIG. 3, to provide the first portion 94 of the first bellows 86 with a compressive force proportional to valve disc displacement. The differential pressure sensor 100 provides the microcomputer 112 with a signal indicative of pressure differential between the first and second tubes 74 and 76, the details of which have also been described with reference to FIG. 3. In addition, a position transducer 124 monitors movement of the actuator piston 48 in order to provide a signal to the microcomputer 112 through a second signal line 126 indicating whether the piston rod 49 has been displaced.

The microcomputer 112 monitors trip signals sent from a turbine control system 128 to a servomotor dump valve (not illustrated) through a third signal line 130. Turbine control commands, which initiate dumping of hydraulic pressure from the servomotor 46 in order to open the nonreturn valve, are monitored by the microcomputer 112 through a fourth signal line 132. Information monitored through the third and fourth lines 130 and 132 is used to correlate control room commands with the signals provided by the differential pressure sensor 100 and the signals provided by the position transducer 124. A control room operator may send a command signal from the control system 128 through control line 134 directing the microcomputer 112 to indicate through a fifth signal line 136 the operational status of the nonreturn valve 10 on a control room display 138.

By way of example, the valve monitor system 120 may indicate the operational status of the nonreturn valve 10 in the following manner. When a command signal is sent from the control system 128 to the microcomputer 112 through the control line 134, the microcomputer 112 determines the position of the actuator piston 48 based on the signal provided by the position transducer 124 through the second signal line 126. After determining the most recent control room command regarding hydraulic pressure of the servomotor 46, based on information provided through the third and fourth signal lines 130 and 132, the microcomputer 112 correlates the position of the actuator piston 48 and nonreturn valve disc with the control room commands. An on-line test can be performed by sending a signal to close the valve 10 by dumping the hydraulic fluid from actuator 48 through dump valve 46. If the valve disc 24 closes by about 20 percent (steam flow will prevent further closure) as indicated by the sensor 100, then valve operation is confirmed.

The valve monitor system 120 will also display the operational status of the mechanical linkage between the actuator piston 48 and the valve disc 24. The apparatus 60 provides the microcomputer 112 with a signal through the first signal line 114 indicative of the differential pressure between the first and second tubes 74 and 76. The microcomputer 112 contains in memory expected signal values corresponding to when the valve disc 24 is in either a fully open position or a fully closed position. A positive correlation, indicating that the linkage is functioning properly, will be provided if the valve disc 24 is in an open position 50 when the piston 48 is fully extended. A positive correlation will also be displayed if the valve disc 24 is in a closed position 50' when the piston 48 is retracted. Otherwise, the valve monitor 120 will display a negative correlation, indicating either that the valve arm 34 is not free to rotate or that the valve disc 24 is not properly secured to the valve arm 34.

While not illustrated in a specific embodiment, the substitution of the monitor of FIG. 4 for that of FIG. 3 in the system of FIGS. 6 and 7 will be apparent.

It will be appreciated by those skilled in the art that broad application can be given to the novel valve monitor system 120 in many embodiments other than those described herein. It will also be apparent to those skilled in the art that many modifications in structure, components and arrangements illustrated herein may be made in the practice of the invention and for adaptation of the invention to monitor displacement of other nonstationary components without departing from the spirit and scope of the invention as defined by the claims which follow.

I claim:

1. Apparatus for monitoring movement of a valve closure disc in a nonreturn valve which is positioned in a steam extraction line to block reverse steam flow, the nonreturn valve comprising a rotatable valve arm coupling a servomotor to the valve disc for power assisted rotation of the valve disc between an open position and a closed position to block reverse steam flow, said apparatus comprising:

(a) first and second tubes for holding pressurized fluid, each having a first end extending within a housing of a nonreturn valve and a second end extending out of the housing;

(b) a first compressible container positioned within the housing for holding pressurized fluid, said first container having a first portion positioned for being compressed by movement of the valve disc, said first container being in fluid communication with the first end of said first tube;

(c) a second compressible container positioned within the housing for holding pressurized fluid, said second container being in fluid communication with the first end of said second tube;

(d) sensing means in fluid communication with the second end of said first tube and the second end of said second tube for sensing a change in equilibrium between fluid in said first tube and fluid in said second tube caused by movement of said valve disc acting on said first container;

(e) position means for providing a signal indicative of servomotor position; and (f) processing means connected to receive signals provided by said sensing means and said position means for correlating actual disc position with actuator position to determine whether the servomotor effectively moves the closure disc between open and closed positions.

2. The apparatus of claim 1 wherein said sensing means comprises a differential fluid pressure gauge.

3. The apparatus of claim 1 wherein said sensing means comprises a flowmeter for providing volumetric flow data indicative of valve disc movement.

4. Apparatus for monitoring displacement of a translational member in a pressurized vessel comprising:

(a) first and second tubes for holding a pressurized fluid, each tube having a respective first end extending into the vessel through a vessel inner wall and a second end extending out of the vessel;

(b) a first compressible bellows for containing a fluid under pressure and positioned in the vessel to receive a compressive force resulting from displacement of the translational member, said first bellows having a lower end in fluid communication with the first end of said first tube;

(c) a second compressible bellows for containing a fluid under pressure and positioned in the vessel with a lower end in fluid communication with the first end of said second tube; and (d) fluid sensor means in fluid communication with the second end of said first tube and the second end of said second tube and responsive to compression of said first bellows for providing a signal indicative of displacement of said translational member.

5. The apparatus of claim 4 wherein said fluid sensor means comprises a differential pressure gauge.

6. The apparatus of claim 4 wherein said fluid sensor means comprises flowmeter means for providing volumetric flow data indicative of displacement of the translational member.

7. The apparatus of claim 6 wherein data provided by said flowmeter means is proportional to volumetric flow rate of the fluid, said apparatus further comprising computer means for determining net fluid volume displaced between said first and second tubes and for determining displacement of the translational member based on the net displaced fluid volume.

8. The apparatus of claim 7 wherein said determining means compares determined translational member displacement with expected displacement and indicates operational status of the translational member based on a correlation between determined and expected translational member displacement.

9. Valve monitor for determining the operational status of a servomotor operated translational valve component in a steam vessel wherein servomotor operation is commanded by a control system, said monitor comprising:

bellows means, positioned in a steam vessel and including a first portion for receiving a compressive force from a translational valve component for providing signals indicative of movement of said component;

spring means positioned between said valve component and said first portion for reacting against said bellows means with a compressive force proportional to component displacement;

a servomotor coupled to said valve component for positioning said valve component in open and closed positions;

transducer means coupled to said servomotor for providing signals indicative of servomotor response to a control system command;

processing means for correlating the control system commands to said servomotor, the operation of said bellows means and said transducer means; and display means for indicating operational status of the valve component based on correlations provided by said processing means.

10. The valve monitor of claim 9 wherein said bellows means comprises:

(a) first and second tubes each having a first end extending into the vessel and a second end extending out of the vessel;

(b) a first fluid containing bellows positioned in the vessel and having a first portion for receiving a compressive force resulting from translation of the valve component, said bellows being in fluid communication with the first end of said first tube;

(c) a second fluid containing bellows positioned in the vessel in fluid communication with the first end of said second tube; and (d) sensing means in fluid communication with the second end of said first tube and the second end of said second tube for providing signals indicative of valve component translation.

11. A system for verifying operability of a nonreturn valve in a steam supply line, the valve having a clapper pivotable between an open and closed position and an arm extending from the clapper to external of the valve for pivoting the clapper, the system comprising:

a servomotor connected to an arm extending from a clapper of a nonreturn valve for pivoting the clapper between open and closed positions;

first and second variable displacement fluid containers positioned within the valve, one of said containers being operatively coupled to the clapper for being compressed when the clapper transitions to a closed position;

a differential fluid pressure sensor positioned externally of the valve, said sensor being coupled to each of said containers for providing an indication of differential pressure therebetween; and means coupled to said sensor for providing an indication of valve operation in response to an indication of differential pressure between said containers.

* * * * *